(12) United States Patent
Narikawa

(10) Patent No.: US 7,976,172 B2
(45) Date of Patent: Jul. 12, 2011

(54) PROJECTION APPARATUS, PROJECTION METHOD, AND COMPUTER PROGRAM

(75) Inventor: Tetsuro Narikawa, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1151 days.

(21) Appl. No.: 11/686,715

(22) Filed: Mar. 15, 2007

(65) Prior Publication Data

US 2007/0216876 A1    Sep. 20, 2007

(30) Foreign Application Priority Data

Mar. 17, 2006  (JP) ................................ 2006-074750
Mar. 17, 2006  (JP) ................................ 2006-074751

(51) Int. Cl.
G03B 21/14        (2006.01)

(52) U.S. Cl. ............. 353/84; 353/85; 353/31; 353/32; 353/33; 353/34; 353/37; 353/98; 353/99; 353/51; 353/57; 353/119; 353/122; 348/770; 348/771; 348/742; 348/743; 359/891; 359/892; 359/893; 359/894; 345/31; 345/32; 345/108

(58) Field of Classification Search ............... 353/84, 353/85, 31, 32, 33, 34, 37, 98, 99, 51, 57, 353/119, 122; 348/770, 771, 742, 743; 345/31, 345/32, 108; 359/891, 892, 893, 894; 250/566, 250/221, 224, 226

See application file for complete search history.

(56) References Cited

U.S. PATENT DOCUMENTS

| | | | | |
|---|---|---|---|---|
| 5,537,168 A | * | 7/1996 | Kitagishi et al. | ............. 353/101 |
| 6,084,235 A | * | 7/2000 | Breithaupt et al. | |
| 6,155,687 A | * | 12/2000 | Peterson | |
| 6,520,648 B2 | * | 2/2003 | Stark et al. | ..................... 353/85 |
| 6,733,137 B2 | * | 5/2004 | Tomiya | ........................... 353/84 |
| 6,908,218 B2 | * | 6/2005 | Sato et al. | ..................... 362/268 |
| 7,111,944 B2 | * | 9/2006 | Morishita | ........................ 353/85 |
| 7,265,370 B2 | * | 9/2007 | Blythe et al. | ................. 250/566 |
| 7,322,703 B2 | * | 1/2008 | Matsui | ........................... 353/84 |
| 7,586,703 B2 | * | 9/2009 | Thollot et al. | ................ 359/889 |

(Continued)

FOREIGN PATENT DOCUMENTS

EP        1 018 723 A2 * 7/2000

(Continued)

OTHER PUBLICATIONS

International Search Report and Written Opinion of the International Searching Authority for PCT/JP2007/055925, dated Jun. 29, 2007. 14 Sheets.

(Continued)

*Primary Examiner* — Georgia Y Epps
*Assistant Examiner* — Sultan Chowdhury
(74) *Attorney, Agent, or Firm* — Holtz, Holtz, Goodman & Chick, PC

(57) ABSTRACT

Light emitted from a lamp enters a color wheel having a region for allowing a predetermined color to pass therethrough, is reflected on a mirror, and enters a DMD. After this, the light is reflected by the DMD and enters a color sensor, which then detects the color of the transmitting light. A projection apparatus automatically synchronizes the control on the rotation of the color wheel and the control on the proceeding direction of the transmitting light by the DMD, based on a color time-division pattern of the transmitting light detected by the color sensor.

14 Claims, 10 Drawing Sheets

U.S. PATENT DOCUMENTS

| | | |
|---|---|---|
| 2003/0112507 A1* | 6/2003 | Divelbiss et al. .............. 359/464 |
| 2003/0179347 A1* | 9/2003 | Tomiya |
| 2004/0041786 A1* | 3/2004 | Inoue et al. ................... 345/156 |
| 2004/0100589 A1* | 5/2004 | Ben-David et al. ........... 348/743 |
| 2004/0125242 A1* | 7/2004 | Kim |
| 2004/0257535 A1* | 12/2004 | Tanaka et al. |
| 2006/0152686 A1* | 7/2006 | Yeralan et al. ................. 353/84 |
| 2006/0215287 A1* | 9/2006 | Keng ............................. 359/891 |

FOREIGN PATENT DOCUMENTS

| | | |
|---|---|---|
| EP | 1 489 851 A1 * | 12/2004 |
| JP | 2003-279887 A | 10/2003 |
| JP | 2004-163876 A | 6/2004 |
| JP | 2005-107400 A | 4/2005 |
| JP | 2005-266021 A | 9/2005 |
| JP | 2006-011088 A | 1/2006 |
| JP | 2006-023436 A | 1/2006 |

OTHER PUBLICATIONS

Japanese Office Action dated May 18, 2010 and English translation thereof, issued in counterpart Japanese Application No. 2006-074750.

Japanese Office Action dated Jul. 20, 2010 and English translation thereof issued in counterpart Japanese Application No. 2006-074751.

* cited by examiner

IMAGE TO BE PROJECTED

PROJECTION APPARATUS, PROJECTION METHOD, AND COMPUTER PROGRAM

BACKGROUND OF THE INVENTION

1. Field of the Invention

The present invention relates to a projection apparatus, a projection method, and a computer program for controlling the projection apparatus.

2. Description of the Related Art

Projection apparatuses generally called projector have become popular as apparatuses for projecting images on a screen. For example, some projectors adopt a single-plate DMD (Digital Micromirror Device™), as one projection method. Such a projector comprises a minute mirror (DMD) whose angle can be controlled. By focusing light, which passes through a rapidly rotating color wheel (color filter) on which red (R), green (G), and blue (B) are arranged, on the DMD, this projector can continuously display images corresponding to these colors respectively. In projecting a black image, the projector uses the DMD to reflect light toward a light absorption plate, and reduces the amount of projection light to be directed to the screen. In other words, when a black image is projected, there exists unused light (useless light) that is not projected on the screen.

For example, Unexamined Japanese Patent Application KOKAI Publication No. 2005-107400 discloses a projector using a pattern-variable color wheel which has regions though which light having the three primary colors of R, G, and B can pass respectively, and a region through which white light can pass. According to this publication, the projector can dynamically change the color tones even in the midst of a projection operation without giving people a feeling of strangeness, by switching the regions of the color wheel to let light pass through by a motor.

A projector using such a color wheel needs to synchronize the control on the rotation of the color wheel and the control by a light modulation device such as a DMD, etc. on the proceeding direction of transmitting light. A conventional method of synchronizing the color wheel and the light modulation device has been to detect a white (W) portion of the color wheel by a photo coupler.

However, since color wheels need individual adjustments because they have manufacturing errors or differ in assembly accuracy, they require a lot of care and cost much in manufacturing. Further, in order to use a pattern-variable color wheel as disclosed in the above-indicated publication, it is necessary to control the color wheel by accurately knowing the boundary between the regions of the respective colors. It has been difficult to perform such precise control.

The present invention provides a projection apparatus, a projection method, and a computer program for solving the above-described problems.

SUMMARY OF THE INVENTION

A projection apparatus according to the present invention comprises: a color wheel including a transmission region which allows at a red ray of light emitted from a light source to pass therethrough, a transmission region which allows a blue ray of the light to pass therethrough, and a transmission region which allows a green ray of the light to pass therethrough; a sensor which detects a ray of light that has passed through the color wheel and has been modulated by a light modulation device; and a control unit which controls a ray of light that has passed through the color wheel to enter a first direction in which an image is projected, or, at a predetermined timing, enter a second direction in which the sensor is disposed, and synchronizes a control on rotation of the color wheel and a control on a proceeding direction of a ray of light modulated by the light modulation devic based on correspondence between a rotation position of the color wheel and a color of a ray of light received by the sensor.

The color wheel may be a variable color wheel on which the transmission regions form a variable pattern.

The control unit may control a ray of light that has passed through the color wheel to enter the second direction, at a timing at which a light path passes any two of the transmission regions of the color wheel including the transmission region for allowing a red ray of light to pass, the transmission region for allowing a blue ray of light to pass, and the transmission region for allowing a green ray of light to pass.

The sensor may be a color sensor which detects a wavelength of a ray of light that enters thereto, within a range of visible light spectrums.

The projection apparatus may comprise a time counting unit which counts a period of time that passes after the projection apparatus is turned on, and when the time counting unit counts a predetermined period of time, the control unit may sense a current timing as the predetermined timing.

The projection apparatus may comprise a temperature measuring unit which measures a temperature rise of the projection apparatus after the projection apparatus is turned on, and when the temperature measuring unit measures a temperature rise amounting to a predetermined degree, the control unit may sense a current timing as the predetermined timing.

A projection method according to the present invention is a projection method for letting a ray of light having a predetermined color pass through a color wheel, which includes a transmission region for allowing a red ray of light emitted from a light source to pass therethrough, a transmission region for allowing a blue ray of the light to pass therethrough, and a transmission region for allowing a green ray of the light to pass therethrough, so that the ray of light having the predetermined color that has passed through the color wheel is modulated by a light modulation device, and comprises: letting a ray of light that has passed through the color wheel enter a first direction in which an image is projected, or, at a predetermined timing, enter a second direction in which a sensor is disposed; detecting, with the sensor, a ray of light that has passed through the color wheel and has been modulated by a light modulation device; and performing a control of synchronizing a control on rotation of the color wheel and a control on a proceeding direction of a ray of light modulated by the light modulation device, based on correspondence between a rotation position of the color wheel and a color of a ray of light received by the sensor.

A computer program according to the present invention controls a computer, which is used for a projection apparatus comprising: a color wheel including a transmission region for allowing a red ray of light emitted from a light source to pass therethrough, a transmission region for allowing a blue ray of the light to pass therethrough, and a transmission region for allowing a green ray of the light to pass therethrough; and a sensor for detecting a ray of light that has passed through the color wheel and has been modulated by a light modulation device, to perform: controlling a ray of light that has passed through the color wheel to enter a first direction in which an image is projected, or, at a predetermined timing, enter a second direction in which the sensor is disposed; and performing a control of synchronizing a control on rotation of the color wheel and a control on a proceeding direction of a ray of light modulated by the light modulation device, based on correspondence between a rotation position of the color wheel and a color of a ray of light received by the sensor.

The projection apparatus according to the present invention may comprise: an image acquiring unit which acquires an image to be projected; a storage unit which stores predetermined correction information for correcting the image acquired by the image acquiring unit; a selection unit which selects the correction information based on a luminance of a ray of light detected by the sensor, and acquires the selected correction information from the storage unit; and an image correction unit which corrects the image acquired by the image acquiring unit based on the correction information acquired by the selection unit, and outputs the corrected image.

A timing at which the sensor senses a ray of light may be a timing at which a predetermined period of time passes after the projection apparatus is turned on.

The selection unit may receive an input of data which designates a grade of brightness, and a grade of contrast, of the image acquired by the image acquiring unit, and acquire the correction information based on at least one of the grade of the brightness and the grade of the contrast.

The projection apparatus may further comprise a notification unit which determines whether or not a luminance of a ray of light detected by the sensor is equal to or smaller than a predetermined reference value, and gives a notification for urging replacement of the light source in a case where the luminance of the ray of light detected by the sensor is equal to or smaller than the predetermined reference value.

A control on the luminance, the brightness, or the contrast may be performed for each of red, green, and blue components of light.

A timing at which the image correction unit corrects an image and outputs it may be an arbitrary timing during image projection.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

A projection apparatus 1 according to an embodiment of the present invention will be explained below.

Figure 1:
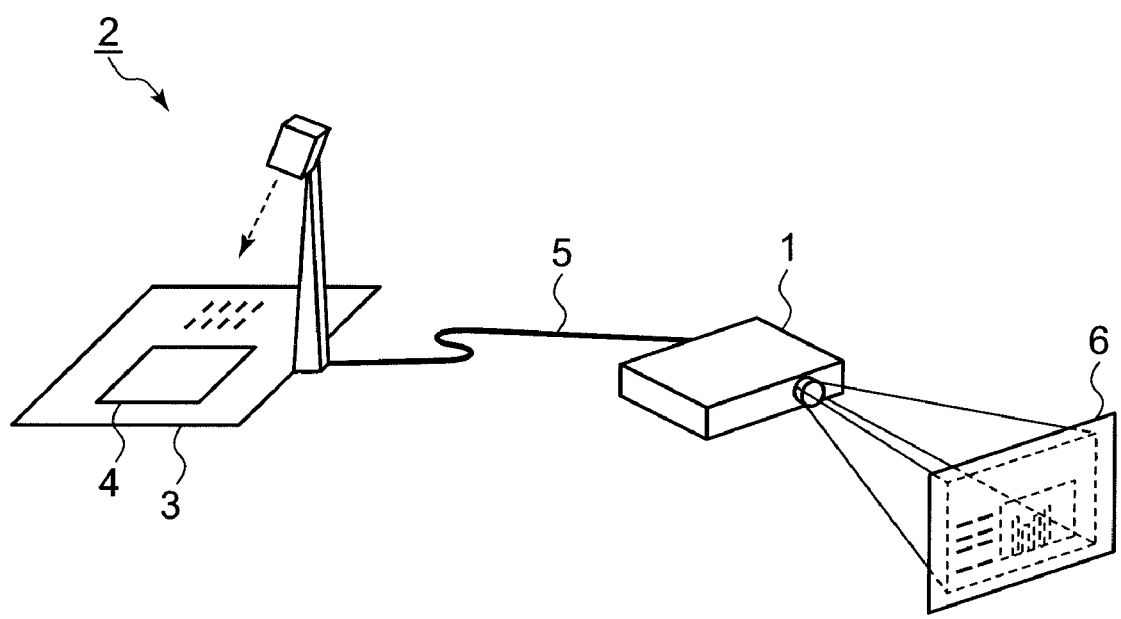
FIG. 1 is a diagram for explaining an image projection system by a projection apparatus of the present invention according to a first embodiment.

FIG. 1 is a diagram showing an example of an image projection system using the projection apparatus 1.

A camera 2 captures an image of a script sheet 4 placed on a base 3. The obtained captured image is input to the projection apparatus 1. The projection apparatus 1 and the camera 2 are connected by a cable 5. The projection apparatus 1 converts the captured image input from the camera 2 into a projection light. The projection apparatus 1 irradiates this projection light and projects an image including the script sheet 4 onto a screen 6.

Figure 2:
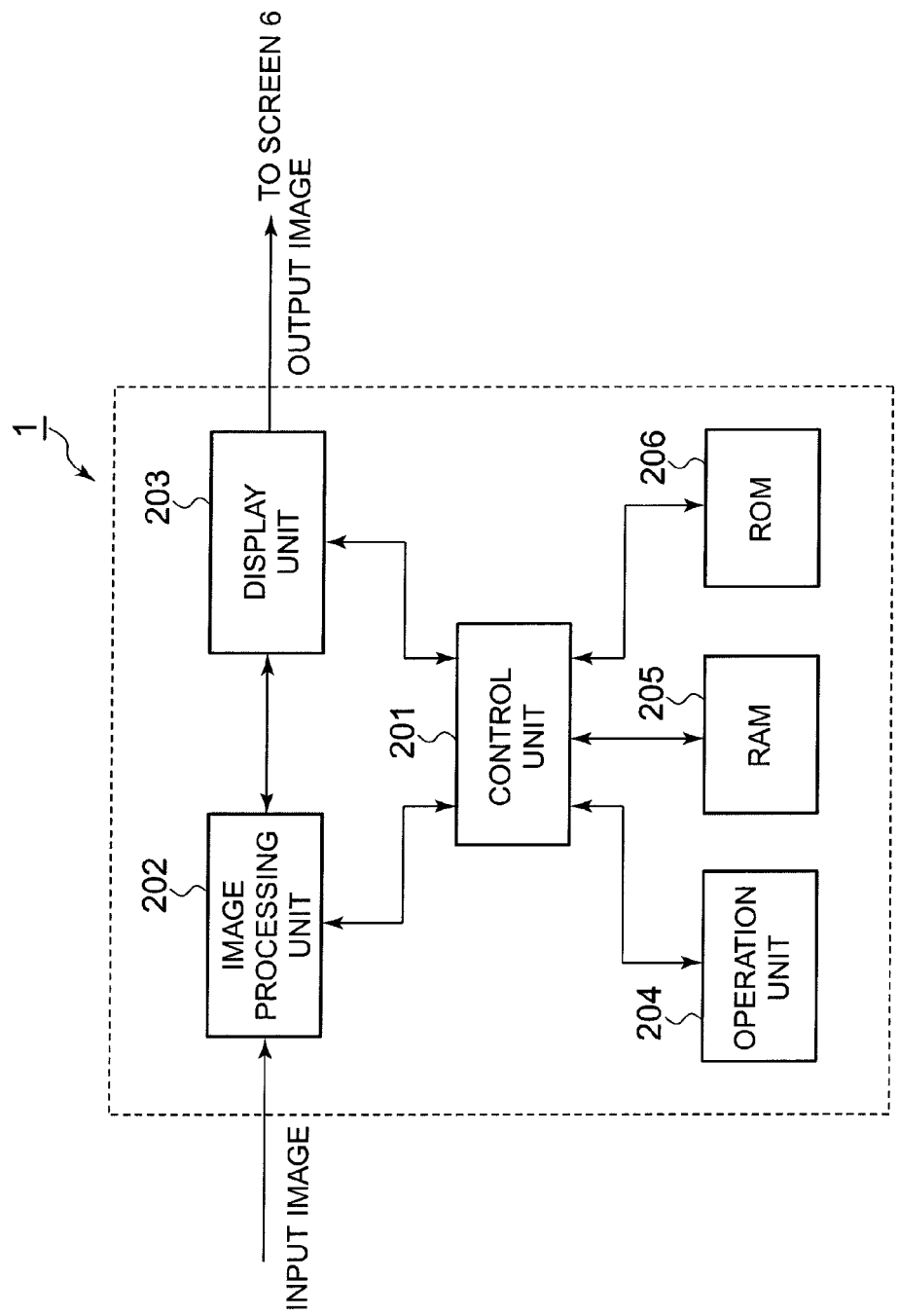
FIG. 2 is a diagram for explaining the structure of the projection apparatus of the present invention according to the first embodiment.

Next, the structure of the projection apparatus 1 according to the present embodiment will be explained with reference to FIG. 2. The projection apparatus 1 comprises a control unit 201, an image processing unit 202, a display unit 203, an operation unit 204, a RAM (Random Access Memory) 205, and a ROM (Read Only Memory) 206.

The control unit 201 controls the entire projection apparatus 1 according to an operating system (OS) and control programs stored in the ROM 206. The control unit 201 sends control signals and data to each unit. The control unit 201 receives response signals and data form each unit. For example, the control unit 201 is constituted by a CPU (Central Processing Unit).

The image processing unit 202 acquires the captured image input from the camera 2, by using an input/output interface (unillustrated) that is comprised in the image processing unit 202. The image processing unit 202 processes the acquired captured image by means of the control unit 201 and an image calculation processor (unillustrated) comprised in the image processing unit 202. The image processing unit 202 records the processed captured image in a frame memory (unillustrated) comprised in the image processing unit 202. The image data recorded in the frame memory is converted into video signals at predetermined synchronization timings (vertical synchronization, etc.) and output to the display unit 203. For example, the image processing unit 202 performs keystone correction, gamma correction, etc. on the captured image. The image calculation processor can rapidly perform overlay calculation, etc. of two-dimensional images. The image processing unit 202 may be configured to acquire a captured image that is acquired by another input/output interface comprised by the projection apparatus 1.

The display unit 203 converts the image data input from the image processing unit 202 into projection light and projects it on the screen 6. The display unit 203 comprises a lamp, a color wheel, a light modulation device, a projection lens, a mirror, a color sensor, etc. The details will be described later.

The operation unit 204 comprises an input device such as an operation button (unillustrated) or the like. The operation unit 204 receives operation instructions for the projection apparatus 1 from the user. Then, the operation unit 204 inputs operation commands corresponding to the received operation instructions to the control unit 201.

The RAM 205 temporarily stores data, programs, etc. necessary for the processes performed by the control unit 201. The control unit 201 provides a variable area in the RAM 205, and performs calculations on a value stored in this variable area. Alternatively, the control unit 201 performs such processes as once storing the value stored in the RAM 205 in a register, performing calculations on the register, and writing the result of calculations back to the RAM 205, etc.

The ROM 206 is a non-volatile memory for storing an OS, programs, etc. necessary for the control on the entire projection apparatus 1. The control unit 201 reads out and executes the OS and programs stored in the ROM 206.

Figure 3:
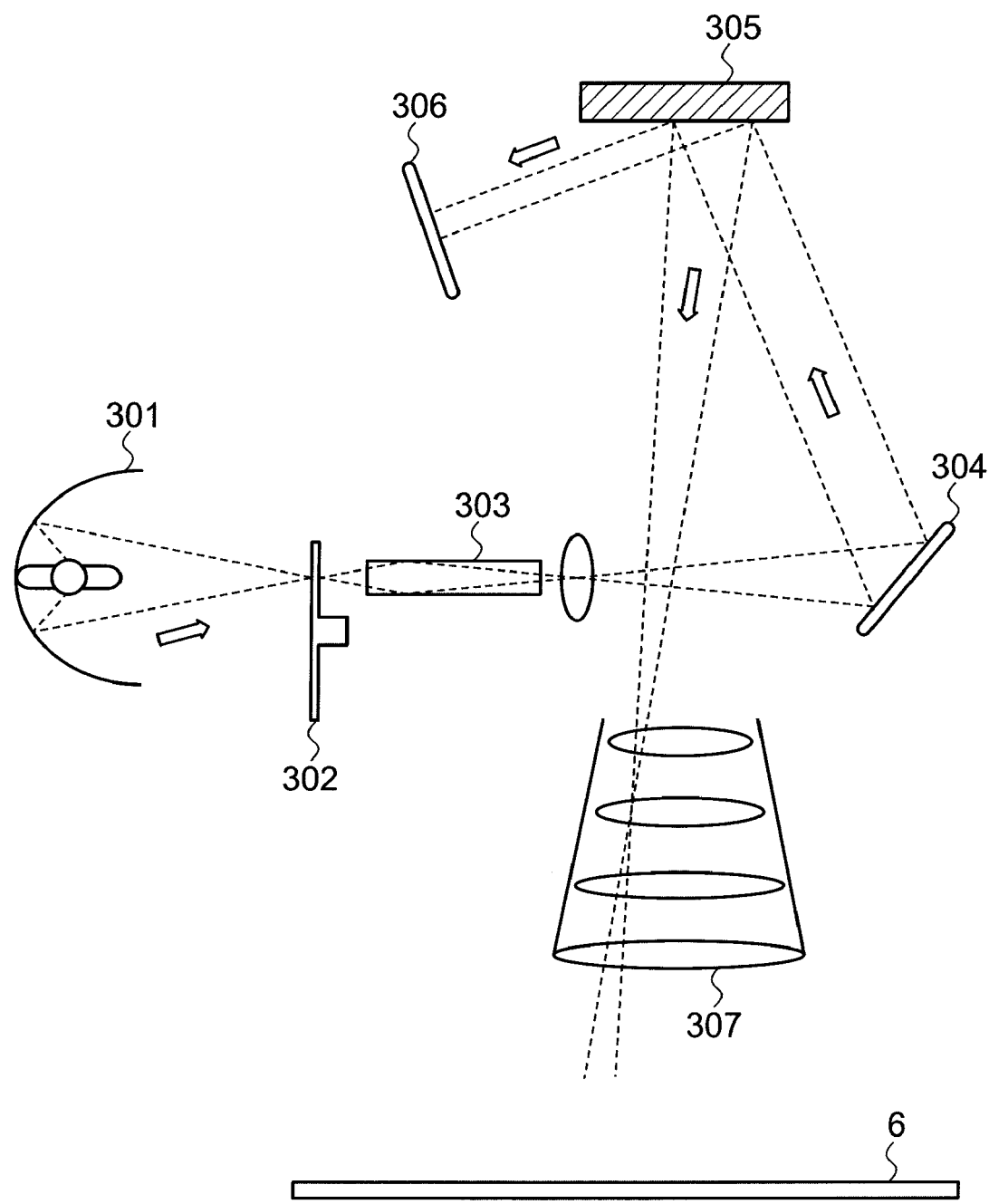
FIG. 3 is a diagram for explaining the structure of a display unit of the projection apparatus of the present invention according to the first embodiment.

Next, the structure of the display unit 203 of the projection apparatus 1 will be explained with reference to FIG. 3. The display unit 203 comprises a lamp 301, a color wheel 302, a light tunnel 303, a mirror 304, a DMD 305, a color sensor 306, and a projection lens 307.

The lamp 301 is a light source used when the projection apparatus 1 projects images on the screen 6. The lamp 301 typically emits white light. The light emitted from the lamp 301 is converged in one by a reflection mirror and let into the color wheel 302.

Figure 4:
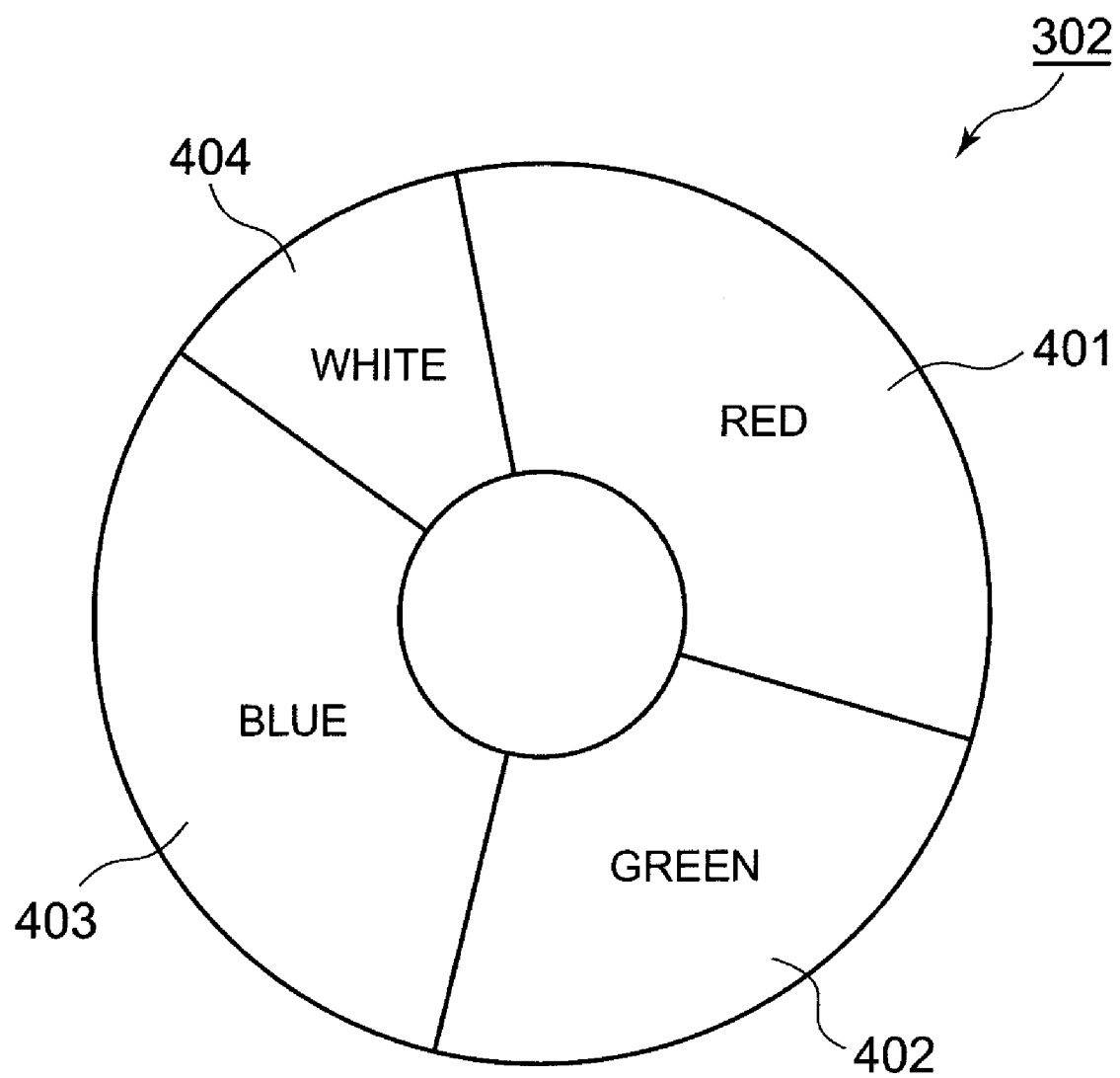
FIG. 4 is a diagram showing an example of the structure of a color wheel of the projection apparatus of the present invention according to the first embodiment.

The color wheel 302 is a disk-like filter having a plurality of transmission regions through which light having predetermined frequencies can pass. For example, the color wheel 302 has a structure as shown in FIG. 4. It should be noted that the shape of the color wheel to be used in the present invention is not limited to the tire shape shown in FIG. 4. The color wheel to be used in the present invention includes an umbrella-shaped one, a ring-shaped one, etc. The color wheel 302 according to the present invention has a red transmission region 401 for allowing red light to pass, a green transmission region 402 for allowing green light to pass, a blue transmission region 403 for allowing blue light to pass, and a white transmission region 404 for allowing light of all of red, green, and blue to pass (allowing white light to pass). The display unit 203 rotates the color wheel 302 at a constant rate by using a motor (unillustrated). White light from the lamp 301 is let into the red, green, blue, and white transmission regions 401 to 404, and rays of light that have corresponding predetermined frequencies pass through the regions. Thereby, the white light from the light source is time-divided into rays of light having the respective colors. The color wheel 302 is not limited to the above-described one. For example, the color wheel 302 may include regions that allow a mid color of adjoining two colors to pass, in addition to the four transmission regions.

The light tunnel 303 reflects the transmitting rays of light that have passed through the color wheel 302 on its internal surface. Then, the light tunnel 303 guides the transmitting rays of light to the mirror 304 while maintaining the light distribution uniform. The time-divided (color-divided) transmitting rays of light go through the light tunnel 303 and enter the mirror 304. The transmitting rays of light that enter the mirror 304 are reflected toward the DMD 305.

Figure 5:
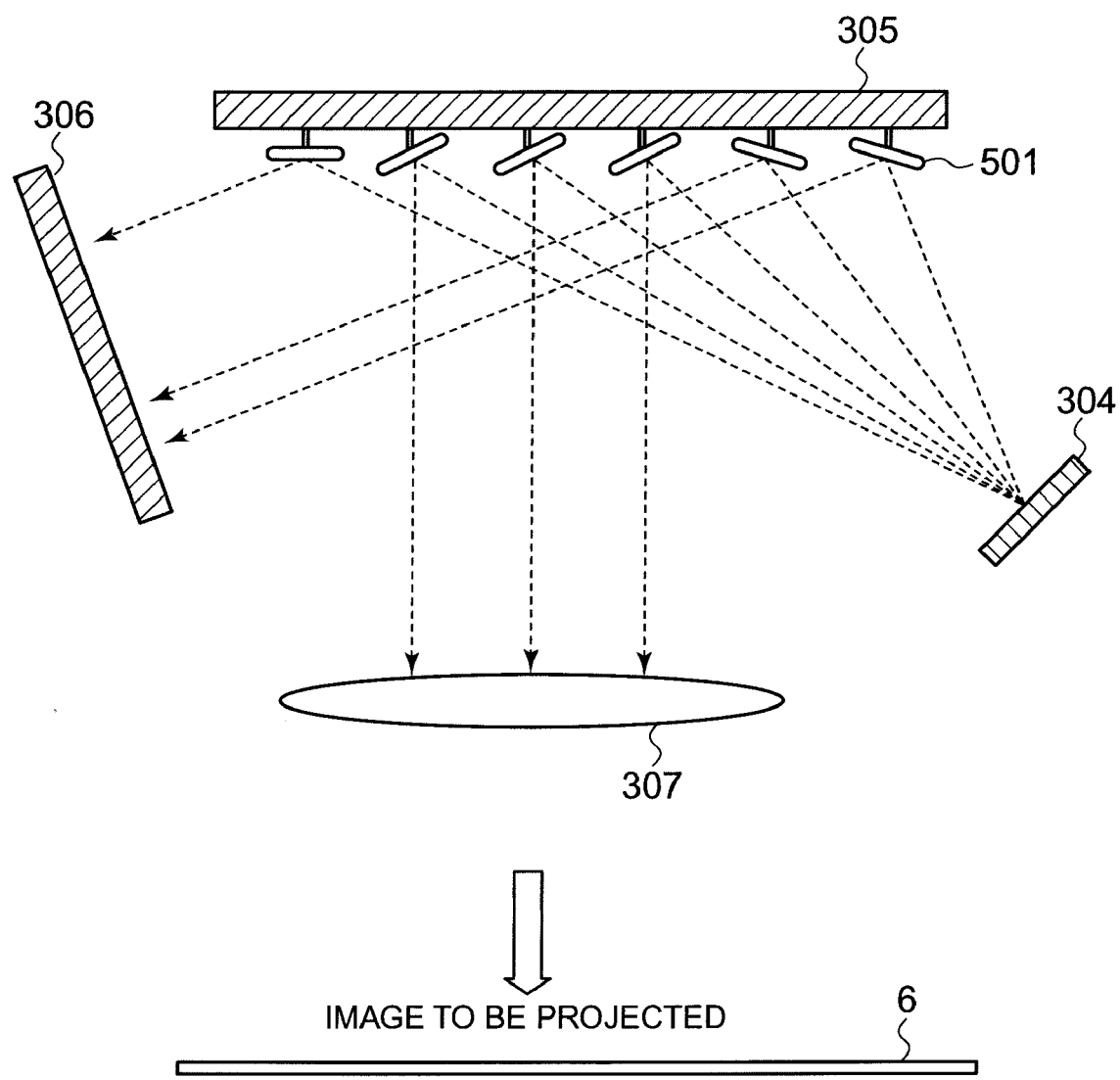
FIG. 5 is a diagram showing that light reflected by micromirrors of the projection apparatus of the present invention according to the first embodiment enters a sensor or a projection lens.

As shown in FIG. 5, the DMD 305 has a plurality of micromirrors (minute mirrors) 501 whose inclination angles can be controlled. The vertical and horizontal widths of each micromirror 501 are each 10 to 20 micrometer (μm) approximately. The micromirror 501 is constituted by a very thin metal piece made of aluminum or the like. The micromirror 501 can be moved by a predetermined inclination angle (typically, ±10° approximately). Thereby, the DMD 305 makes light enter the projection lens 307 or the color sensor 306 repeatedly at predetermined time intervals to adjust the light amount. The DMD 305 can control the direction in which light is reflected, by using the micromirrors 501. One micromirror 501 corresponds to one pixel of the image to be projected on the screen 6.

In projecting transmitting light that has passed through the color wheel 302 on the screen 6, the DMD 305 controls the facing directions of the micromirrors 501 such that the transmitting light is reflected to the direction (first direction) of the projection lens 307. On the other hand, in projecting a black image on the screen 6 (prohibiting light of all red, green, and blue from being transmitted to the screen), the DMD 305 controls the facing directions of the micromirrors 501 such that the transmitting light is reflected to the direction (second direction) of the color sensor 306. That is, in the case where a black image is projected on the screen 6, it is conventional that the transmitting light does not enter the projection lens 307 and ends up as unused light (useless light). However, according to the present invention, this unused light is sensed by the color sensor 306. Then, as will be described later, the control on the rotation of the color wheel 302 and the control on the proceeding direction by the micromirrors 501 of the DMD 305 are synchronized with each other, based on a color time-division pattern detected by the color sensor 306.

The color sensor 306 detects the visible light spectrums of the reflected light dividedly as red, green, and blue color signals. The range of wavelengths of visible light is about 400 to 800 nanometer (nm). The wavelengths of three primary colors of light are about 450 nm of blue, 530 nm of green, and 680 nm of red, respectively. The light intensities of these wavelengths are measured by photo transistors, and the color of the light that has entered the color sensor 306 is determined based on the combination of the intensities of output currents from the photo transistors. That is, the color sensor 306 can determine which of red, green, blue, and white the rays of light passing through the transmission regions 401 to 404 of the color wheel 302 have. Therefore, the color sensor 306 can acquire a color time-division pattern. In this way, the color sensor 306 can accurately grasp the light conditions of the light source without grasping the accurate positions of the transmission regions 401 to 404 of the color wheel 302 (the positions of the boundary between the transmission regions). The projection apparatus 1 according to the present invention can use the color sensor 306 as a sensor in one embodiment. In a case where an optical sensor is used, only brightness can be sensed. However, with the use of the color sensor 306, not only brightness, but also luminance and contrast can be sensed. In a case where an image sensor is used, the amount of data to be transmitted is large and a long time is required in detection. However, with the use of the color sensor 306, light can be detected more quickly. This is because it is possible to synchronize the control on the rotation of the color wheel 302 and the control on the proceeding direction of the light modulated by the light modulation device 305, based on the colors sensed by the color sensor. Further, with the use of the color sensor 306, in a case where image correction is required, brightness correction and contrast correction of higher performance can be made. That is, since the luminance of each of red, green, and blue colors is directly acquired with the use of the color sensor 306, quicker and higher-performance image corrections can be made.

The time division pattern signal detected by the color sensor 306 is input to the control unit 201. The control unit 201 synchronizes the control on the rotation of the color wheel 302 and the control on the proceeding direction of the transmitting light by the DMD 305, based on the time-division pattern acquired by the color sensor 306.

Figure 6:
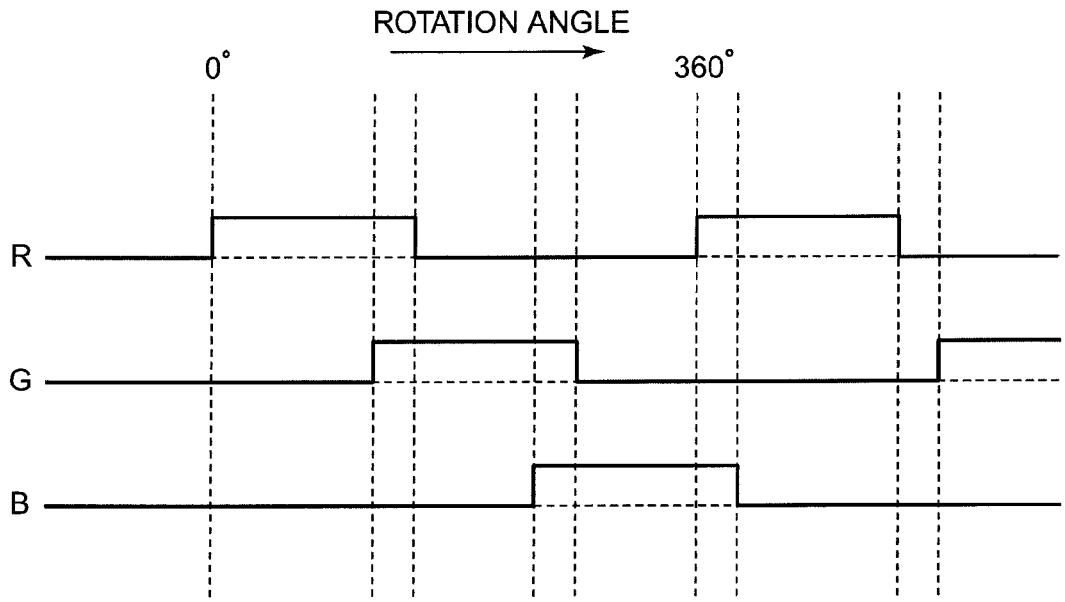
FIG. 6 is a diagram showing an example of a color time-division pattern detected by the sensor of the projection apparatus of the present invention according to the first embodiment.

For example, FIG. 6 is a diagram showing an example of the color time-division pattern detected by the color sensor 306. To facilitate understanding, FIG. 6 represents the outputs corresponding to red (R), green (G), and blue (B) by pulses of 1 or 0. When the color wheel 302 starts to rotate from the rotation angle of 0°, the colors that enter the color sensor 306 changes among R, G, and B, along with the change of the rotation angle. The rotation angle of 360° indicates that the color wheel 302 has made one turn.

FIG. 6 shows a state that any of R and G combination, G and B combination, and B and R combinations is output as pulses of 1 simultaneously. However, this is not the requisite of the present invention, but in time domains where two primary colors exist, the ratio between them may be adjusted. Further, the ratio may be variable.

Note that the color sensor 306 should not be limited by the present invention. Any sensor can be used as long as it can determine which transmission region of the color wheel 302 has been passed by light (or what ratio the three primary colors of the transmitting light have).

The projection lens 307 converges light reflected by the DMD 305, and projects an image on the screen 6.

For example, assume that a captured image (input image) input to the image processing unit 202 is made up of a predetermined number of pixels (for example, 1024×768 pixels, etc.), and colors (for example, RGB of 256 grades) to be output from the pixels are associated with these pixels respectively. After image processes such as keystone correction, gamma correction, etc. are performed, the image processing unit 202 inputs the corrected image data to the display unit 203. In order that the color represented by each pixel constituting the corrected image data can be correctly projected on the screen 6, the display unit 203 adjusts the rotation position of the color wheel 302 (or the position on the color wheel 302 to which light is converged) and the angle of the micromirror 501 provided on the DMD 305 for each pixel, and projects a resulting image on the projection lens 307. The content of the image processes performed by the image processing unit 202 is not limited by the present invention.

Figure 7:
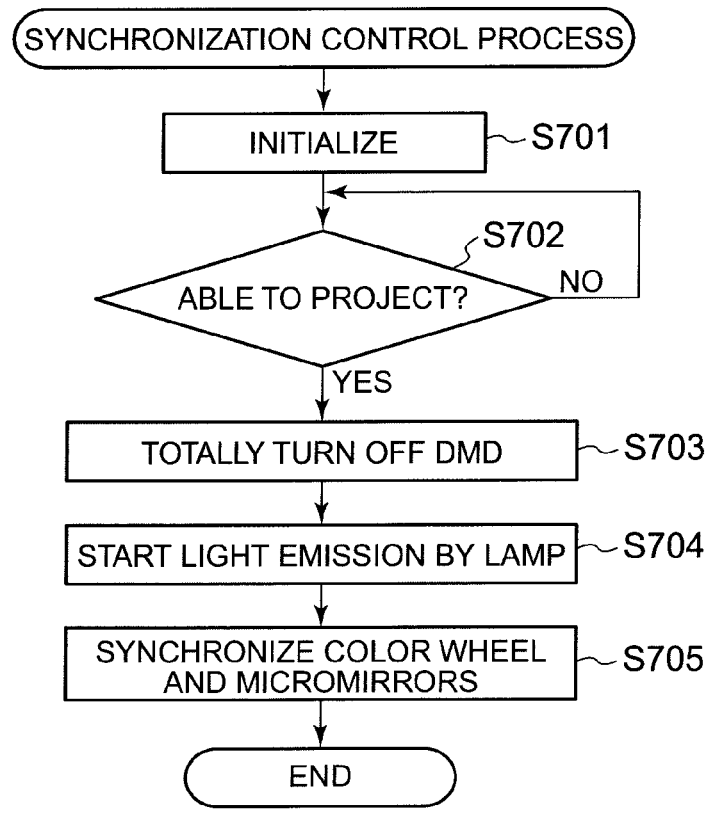
FIG. 7 is a flowchart for explaining a synchronization control process by the projection apparatus of the present invention according to the first embodiment.

Next, a synchronization control process for controlling the synchronization between the color wheel 302 and the DMD 305 performed by the control unit 201 of the present embodiment will be explained with reference to a flowchart of FIG. 7. In the present embodiment, the control unit 201 performs this synchronizing process immediately after the projection apparatus 1 is turned on. However, the timing to perform the synchronizing process is not limited to this. For example, the synchronizing process may be performed at a timing at which rays of light having any two colors of the three primary colors of red, green, and blue have passed through the color wheel 302.

First, the control unit 201 initializes the display unit 203 (step S701). Specifically, the control unit 201 starts power supply to the lamp 301 of the display unit 203, so that the lamp 301 is warmed to a temperature sufficient for projecting an image. Further, the control unit 201 controls the rotation position of the color wheel 302 and the light reflecting direction of the micromirrors 501 provided on the DMD 305 to the initial states.

Next, the control unit 201 determines whether or not the display unit 203 has become able to project an image (step S702). Specifically, for example, the control unit 201 determines whether or not the temperature of the lamp 301 has become the temperature sufficient for projecting an image.

In a case where the display unit 203 has not become able to project an image (step S702; NO), the control unit 201 waits until the display unit 203 become able to project an image.

To the contrary, in a case where the display unit 203 has become able to project an image (step S702; YES), the control unit 201 controls light modulation by the DMD 305 to be totally turned off (step S703). That is, the control unit 201 controls the display unit 203 to orient all the micromirrors 501 provided on the DMD 305 to the direction in which the color sensor 306 is set.

Next, the control unit 201 controls the lamp 301 to start light emission (step S704). Here, the micromirrors 501 face not the first direction in which the projection lens 307 is set but the second direction in which the color sensor 306 is set. Therefore, the projection light enters the color sensor 306, but does not enter the projection lens 307.

Then, the control unit 201 synchronizes the rotation position of the color wheel 302 and the timing at which the DMD 305 performs light modulation, based on a color time-division pattern shown by the red transmission region 401, the green transmission region 402, the blue transmission region 403, or the white transmission region 404 included in the color wheel 302, detected by the color sensor 306 (step S705).

Specifically, for example, the display unit 203 rotates the color wheel 302 from rotation start position P1, by the motor. At this time, if the color detected by the color sensor 306 is a color C1, the control unit 201 determines that the transmission region of the color wheel 302 that corresponds to the rotation start position P1 is the transmission region of the color C1. Likewise, if the color detected by the color sensor 306 when the color wheel 302 is rotated by means of the motor to a position P2 is a color C2, the control unit 201 determines that the transmission region of the color wheel 302 that corresponds to the position P2 is the transmission region of the color C2. The control unit 201 acquires a time-division pattern indicating the correspondence between the rotation position of the color wheel 302 and the color detected by the color sensor 306. That is, the control unit 201 acquires information indicating to what degree the color wheel 302 should be rotated in order to project the colors C1 and C2. The control unit 201 acquires information indicating to what degree the reflecting direction of the transmitting light by the DMD 305 should be changed. Based on this information, the control on the rotation of the color wheel 302 and the control on the proceeding direction of the transmitting light by the DMD 305 can be synchronized.

According to the present embodiment, the projection apparatus 1 can synchronize the timing to rotate the color wheel 302 and the timing at which the DMD 305 performs light modulation, even without previously storing the correct positions of the transmission regions of the respective colors of the color wheel 302. Therefore, even if there is any error that occurs in the manufacturing process or occurs due to aging after the start of use, such as an error in the attaching position of the color wheel 302, a minute slide of the color pattern of the color wheel 302, individuality of the motor of the color wheel 302, missing the point on the color wheel 302 onto which light should be converged, etc., such an error can be automatically adjusted with no need of adjustments by eye observation.

Particularly, by detecting the color time-division pattern of the transmitting light by using the color sensor 306, it is possible to accurately grasp the boundaries and colors of the color pattern of the color wheel 302. That is, it is possible to easily and automatically synchronize the control on the rotation of the color wheel 302 and the control on the proceeding direction of the transmitting light by the DMD 305.

This synchronizing process may be performed at a timing at which a predetermined period of time has passed after the projection apparatus 1 is turned on, such as when the lamp 301 has been warmed to a temperature sufficient for projecting an image, etc. In such a case, it is possible to project an image without giving the user a feeling of strangeness, from the very start of projection. That is, a time counting unit (unillustrated) for counting a time that is passing, counts until a predetermined period of time passes after the projection apparatus 1 is turned on. Then, when the time counting unit has counted until the predetermined period of time passes, the control unit 201 perceives this timing as a predetermined timing at which light should be sensed by the color sensor 306. An ordinarily used timer can be used as the time counting unit. Further, a temperature measuring unit (unillustrated) for measuring a rise of the temperature of the projection apparatus 1 since the projection apparatus 1 is turned on, may be provided. When the temperature measuring unit measures that the temperature has risen by a predetermined degree, the control unit 201 senses this timing as a predetermined timing at which light should be sensed by the color sensor 306. An ordinarily used thermostat may be used as the temperature measuring unit. The temperature measuring unit can be disposed near the lamp 301.

The present invention is not limited to the above-described embodiment, but may be variously modified at the implementing stages within the scope of the meaning of the invention. The functions performed in the above-described embodiment may be implemented in all arbitrary combinations conceivable. Inventions at various stages are included in the above-described embodiment, and various inventions can be extracted based on arbitrary combinations of a plurality of components disclosed. For example, even if some components are removed from all the components shown in the embodiment, the structure from which these components have been removed can be extracted as an invention as long as any effect can be achieved.

Figure 8:
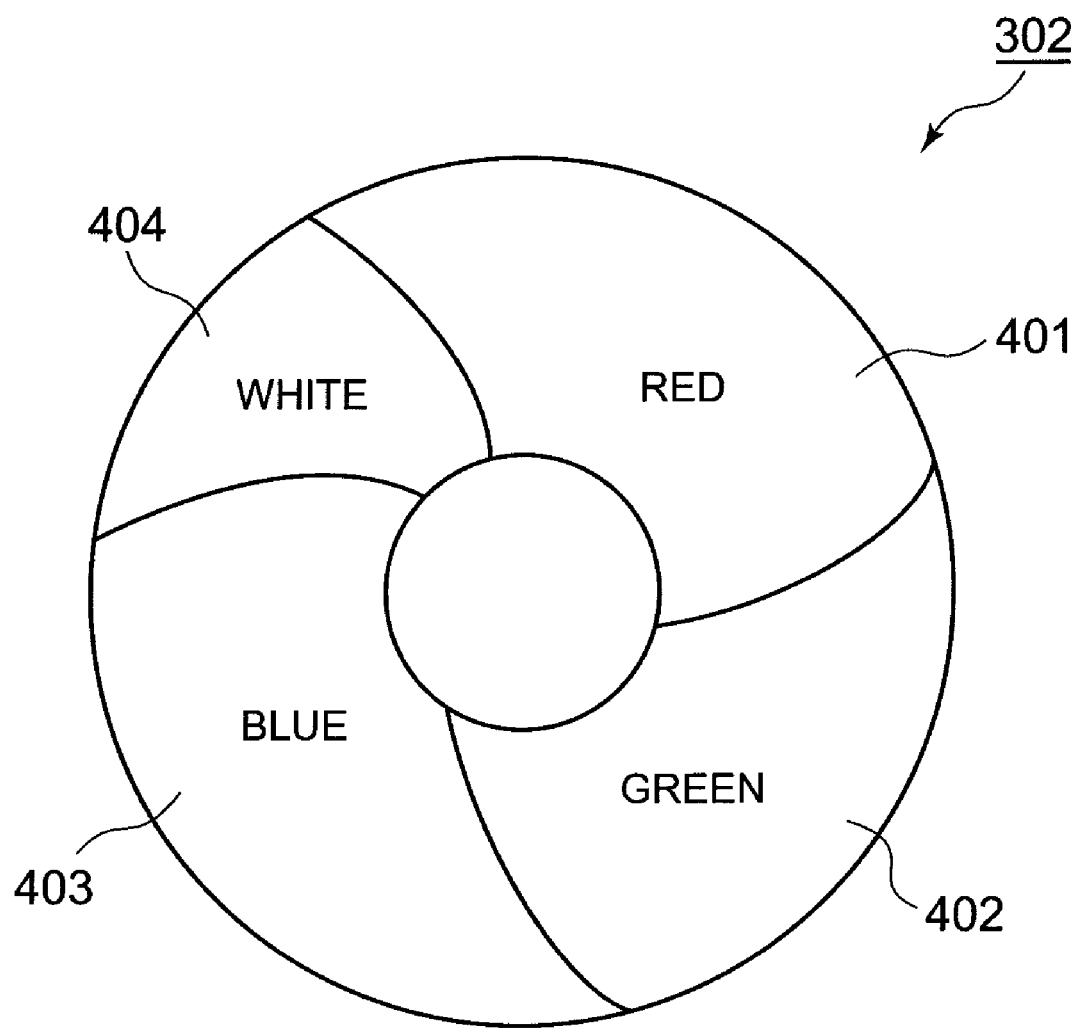
FIG. 8 is a diagram showing an example of the structure of a pattern-variable color wheel of the projection apparatus of the present invention according to the first embodiment.

For example, the present invention can also be applied to a projector, which uses a pattern-variable color wheel as disclosed in the above-indicated publication. A pattern-variable color wheel is a color wheel 302 having, for example, a structure as shown in FIG. 8. The pattern-variable color wheel is divided into transmission regions of respective colors, by predetermined boundaries from about the center to about the circumference. According to this structure, it is possible to change the time division pattern of transmitting light, by shifting the position on the color wheel 302 to which the light is converged, from about the center to about the circumference. In a case where such a pattern-variable color wheel is used too, it is possible to accurately grasp the boundaries, colors, etc. of the color pattern.

That is, also in the case where the projection apparatus 1 uses a pattern-variable color wheel, it needs not previously store the accurate positions of the transmission regions of the respective color of the color wheel 302, and can easily synchronize the control on the rotation of the color wheel 302 and the control on the proceeding direction of transmitting light by the light modulation device.

Moreover, in the case where a patter-variable color wheel is used as the color wheel 302, it is possible to dynamically change the color tone even in the middle of projection. For example, it is possible to smoothly switch the focus between luminance-conscious and color reproductivity-conscious, without giving viewers of the images a feeling of strangeness.

Further, as described above, the timing at which the synchronizing process is performed is not limited to the present embodiment. For example, it may be a timing at which rays of light having any two of the three primary colors of red, green, and blue have passed through the color wheel 302. This timing is particularly effective in a case where a pattern-variable color wheel is used. That is, by synchronizing the control on the rotation of the color wheel 302 and the control on the proceeding direction of transmitting light by the light modulation device when the light is converged on a boundary between transmission regions, it is possible to automatically achieve synchronization that is suitable for changed tones, even if a predetermined boundary from about the center to about the circumference is not accurately grasped.

That is, in the case where a pattern-variable color wheel is used as the color wheel 302, it is possible to easily attain synchronization that is appropriate for the changed tones, even if a predetermined boundary from about the center to about the circumference is not accurately grasped.

The light modulation device mounted on the projection apparatus 1 described herein may be any of a DMD, an LCD (Liquid Crystal Display), an LCOS (Liquid Crystal On Silicon), a GxL™, etc.

Further, the present invention may be applied to a system comprising a plurality of devices, or to an apparatus comprising one device.

Furthermore, the projection apparatus 1 of the present invention is exemplified as a front projector, but may be a rear projector.

Yet further, the present invention can also be applied to a program for controlling a system or an apparatus to perform the processes defined by the present invention.

A computer to be used for a projection apparatus, which comprises the color wheel 302 including a plurality of transmission regions for allowing light of predetermined colors such as red, green, blue, white, etc. to pass, and a sensor for receiving transmitting light that has passed through the color wheel 302 to be modulated by the light modulation device, can easily synchronize the control on the rotation of the color wheel 302 and the control on the proceeding direction of the transmitting light by the light modulation device, even if the computer does not previously store accurate positions of the transmission regions of the respective colors of the color wheel 302. For example, even if there is any error that occurs in the manufacturing process, etc., such as an error in the attaching position of the color wheel 302, a minute slide of the color pattern of the color wheel 302, individuality of the motor of the color wheel 302, missing the point on the color wheel 302 onto which light should be converged, etc., such an error can be automatically adjusted with no need of adjustments by eye observation.

As explained above, according to the present invention, it is possible to provide a projection apparatus, a projection method, and a program suitable for easily synchronizing the color wheel and the light modulation device.

Next, a second embodiment, which includes additional functions besides those of the above-described embodiment, will be explained.

Note that the second embodiment includes the operations of the above-described embodiment, which will be similar to those explained in the above-described embodiment, and the explanation of the above-described embodiment will therefore be incorporated hereinafter by denoting the same reference numerals to similar components.

Figure 9:
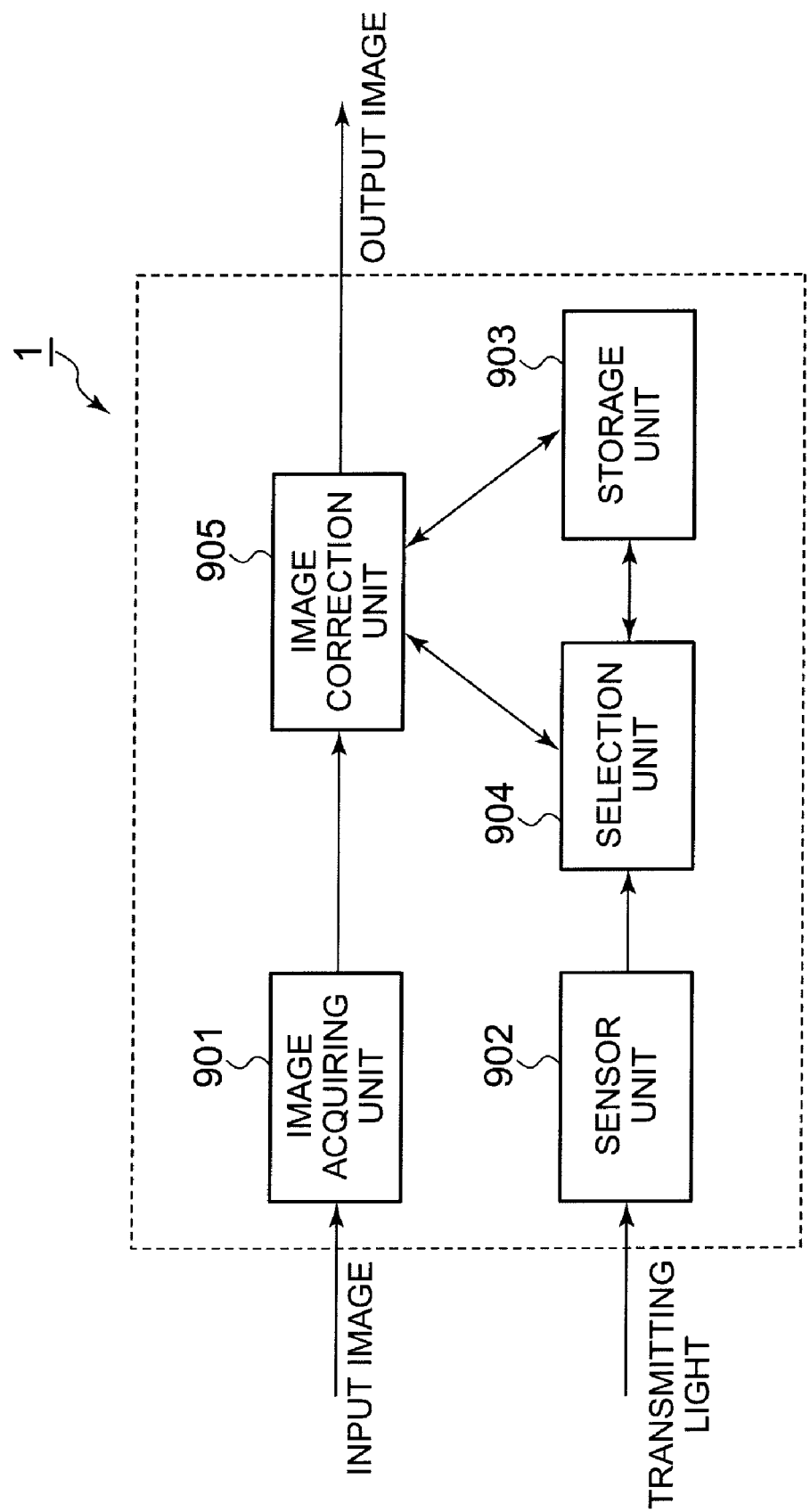
FIG. 9 is a diagram for explaining an image process by a projection apparatus of the present invention according to a second embodiment.

Processes added to the above-described embodiment, which will be performed by the control unit 201, etc. of the projection apparatus 1 of the second embodiment will be explained with reference to FIG. 9. The projection apparatus 1 comprises an image acquiring unit 901, a sensor unit 902, a storage unit 903, a selection unit 904, and an image correction unit 905.

The image acquiring unit 901 acquires an image to be projected on the screen 6 as an input image, and inputs it to the image correction unit 905. For example, in the case of such an image processing system as shown in FIG. 1, the image acquiring unit 901 acquires a captured image including a script sheet 4 captured by the camera 2.

The control unit 201 and the image processing unit 202 function as the image acquiring unit 901 by working in cooperation with each other.

The sensor unit 902 comprises a color sensor 306 for detecting transmitting light that has been emitted from the lamp 301 and modulated by the DMD 305. As described above, the display unit 203 adjusts the light amount by controlling the facing direction of the micromirrors 501 and making the transmitting light enter the projection lens 307 or the color sensor 306 repeatedly at predetermined time intervals. According to the present embodiment, the color sensor 306 is positioned in a predetermined direction different from the direction in which the screen 6 on which images are projected. The color sensor 306 detects transmitting light at a predetermined timing different from the timing to project an image. That is, the color sensor 306 senses unused light (useless light) that is not to be projected on the screen 6. The sensor unit 902 inputs sensor data acquired by the color sensor 306 to the selection unit 904. For example, the sensor data is data which represents visible light spectrums of reflected light dividedly as color signals of red, green, and blue (three primary colors), with the luminance (light intensity) of each color evaluated in 256 grades.

The display unit 203 and the control unit 201 function as the sensor unit 902 by working in cooperation with each other.

The storage unit 903 stores predetermined correction information for correcting the color of the input image acquired by the image acquiring unit 901, in the ROM 206 or the like in association with the luminance of the transmitting light that is to be detected by the color sensor 306. Here, the predetermined correction information is, for example, tone curves 1001 as shown in FIGS. 10A to 10D. The horizontal axis of FIGS. 10A to 10D represents the brightness of the input image and the vertical axis represents the brightness of the output image.

The ROM 206 and the control unit 201 function as the storage unit 903 by working in cooperation with each other. However, the projection apparatus 1 may comprise a storage device of any type such as a hard disk, a magnetic tape, a non-volatile memory, such as a flash memory, a hologram memory, and a three-dimensional memory, etc., and rewritably store data in such a storage device, so that the storage unit 903 may be configured to function by such a storage device and the control unit 201 working in cooperation.

Figure 10A:
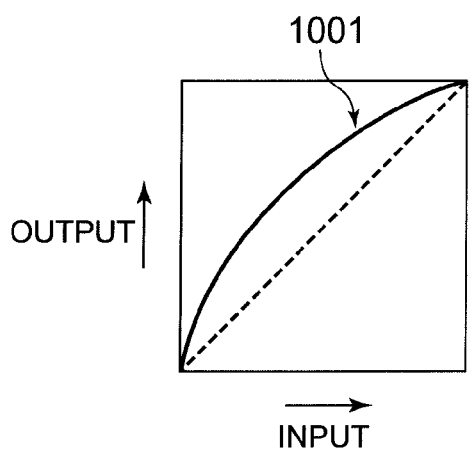
FIG. 10A is a diagram showing an example of a tone curve used for performing the image process by the projection apparatus of the present invention according to the second embodiment.

The tone curve 1001 of FIG. 10A shows that the brightness of the output image is on the whole greater than that of the output image of a reference line (indicated by a dot line in the drawing), which has the brightness of the input image and the brightness of the output image equated. That is, if the color of the input image is corrected according to this tone curve 1001, the output image will be corrected to become brighter on the whole.

Figure 10B:
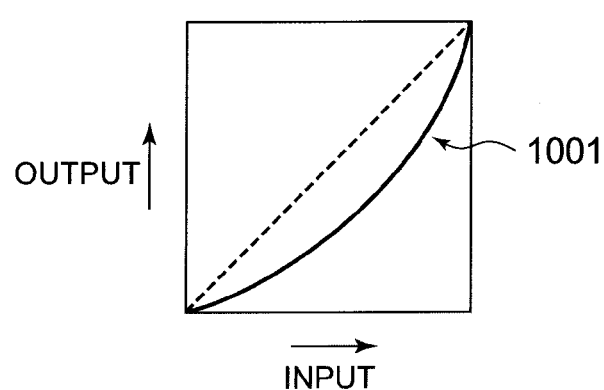
FIG. 10B is a diagram showing an example of a tone curve used for performing the image process by the projection apparatus of the present invention according to the second embodiment.

The tone curve 1001 of FIG. 10B shows that the brightness of the output image is on the whole smaller than that of the output image of the reference line. That is, if the color of the input image is corrected according to this tone curve 1001, the output image will be corrected to become darker on the whole.

Figure 10C:
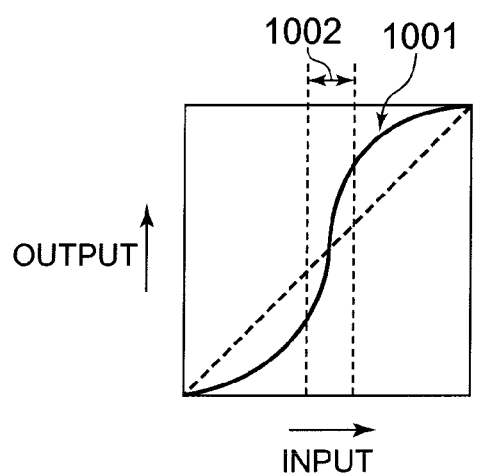
FIG. 10C is a diagram showing an example of a tone curve used for performing the image process by the projection apparatus of the present invention according to the second embodiment.

The tone curve 1001 of FIG. 10C shows that the brightness of the output image is darker than that of the output image of the reference line where the brightness of the input image is dark, and reversely that the brightness of the output image is brighter than that of the output image of the reference line where the brightness of the input image is bright. That is, if the color of the input image is corrected according to this tone curve 1001, the output image will be corrected such that its contrast is emphasized on the whole.

Brightness control described above can be performed for each of the red, green, and blue components of the light. More accurate correction is available if the control is performed for each component of the light. Further, contrast control can also be performed for each of the red, green, and blue components of the light. Furthermore, luminance control can also be performed for each of the red, green, and blue components of the light.

Figure 10D:
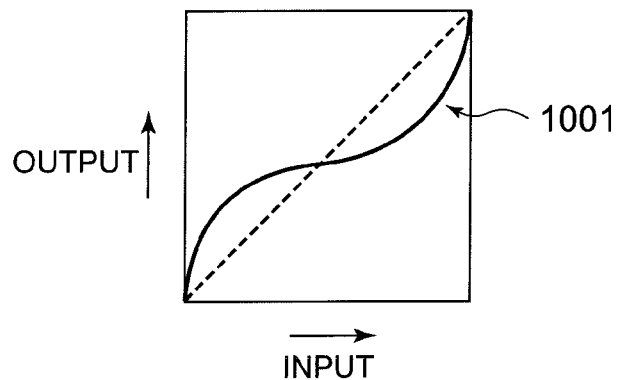
FIG. 10D is a diagram showing an example of a tone curve used for performing the image process by the projection apparatus of the present invention according to the second embodiment.

The tone curve 1001 of FIG. 10D shows that the brightness of the output image is brighter than that of the output image of the reference line here the brightness of the input image is dark, and reversely that the brightness of the output image is darker than that of the output image of the reference line where the brightness of the input image is bright. That is, if the color of the input image is corrected according to this tone curve 1001, the output image will be corrected such that its contrast is weakened on the whole.

According to the present embodiment, each tone curve 1001 is represented by a predetermined function $y=f(x)$ (where $0 \leq x \leq 255$), which associates, in one-to-one correspondence, the brightness x of each of the colors (red, green, and blue) of each pixel of the input image, with the rightness y of each of the colors of each pixel of the output image. However, the tone curves 1001 are not limited to such ones, but may be ones that are represented by a table, a database, or the like, that associates the value of the brightness of the input image with the value of the brightness of the output image. Further, the tone curves 1001 may be such ones that associate the input image with the output image in a manner that y takes a value "0" ($y=0$) where x is in a predetermined first section ($0 \leq x < X1$), y takes a value "2x" ($y=2x$) where x is in a predetermined second section ($X1 \leq x < X2$), and y takes a value "0" ($y=0$) where x is in a predetermined third section ($X2 \leq x \leq 255$).

The selection unit 904 selects and acquires predetermined correction information from the storage unit 903 based on the luminance detected by the color sensor 306, and inputs the acquired correction information to the image correction unit 905. Specifically, for example, in a case where the brightness of each pixel of the input image is distributed unevenly to the darker side and the standard deviation of this distribution is smaller than a reference value, the selection unit 904 selects and acquires the tone curve 1001 as shown in FIG. 10A, that is for brightening the output image on the whole. For example, in a case where the brightness of each pixel of the input image is distributed unevenly at about a given value and the standard deviation of this distribution is smaller than the reference value, the selection unit 904 selects and acquires the tone curve 1001 as shown in FIG. 10C, that is for emphasizing the contrast of the output image.

The image processing unit 202 and the control unit 201 function as the selection unit 904 by working in cooperation with each other.

The selection unit 904 may select and acquire one of the tone curves 1001 stored inn the storage unit 903 and further perform a predetermined calculation to define the tone curve 1001. For example, in a case where the brightness of each pixel of the input image is distributed unevenly to a given value V1 and the standard deviation of this distribution is smaller than the reference value, the selection unit 904 may select the tone curve 1001 as shown in FIG. 10C that is for emphasizing the contrast, and perform a calculation for shifting the center section 1002 where the degree of emphasizing the contrast is large, to about the value V1. This calculation may be performed arbitrarily.

The image correction unit 905 performs an image process for correcting the input image based on the correction information acquired by the selection unit 904, and outputs the corrected image data. For example, this image process is gamma correction for correcting a gamma value, which represents the response characteristic of the gradation of the image, to an output characteristic that is optimum for the characteristic of the display unit 203, the attaching errors of the color wheel 302, the DMD 305, etc., changes by aging, difference in use environment, etc. Thus, the projection apparatus 1 can correct the input image.

The image processing unit 202, the display unit 203 and the control unit 201 function as the image correction unit 905 by working in cooperation with one another.

That is, the transmitting light that is sensed by the color sensor 306 is not a projection light to be projected onto the screen 6, but unused light (useless light) that is not to be projected on the screen 6. Further, the color sensor 306 detects transmitting light at another timing than the timing at which an image is projected on the screen 6. Therefore, image projection is not suspended for any while, or no unnecessary color mark or the like is displayed, and image correction can be performed with no feeling of strangeness given to the user. Further, since the luminance of each color of red, green, and blue is acquired by the color sensor 306, quicker and higher-performance image correction can be performed. And correction can be performed automatically and easily even if there is variation in the output characteristics of the image due to the characteristic of the display unit 203, attaching errors of the color wheel 302, the DMD 305, etc., changes by aging, difference in use environment, etc. It is possible to achieve the same effect also when the projection method shown in the present embodiment is used.

The timing at which the sensor unit 902 detects transmitting light may be, for example, a timing when a predetermined period of time has passed after the projection apparatus 1 is turned on.

That is, by performing this image correction process at a timing when a predetermined period of time has passed after the projection apparatus 1 is turned on, such as when the lamp 301 has been warmed to a temperature sufficient for projecting an image, etc., it is possible to project an image without giving the user a feeling of strangeness, from the very start of image projection.

Figure 11:
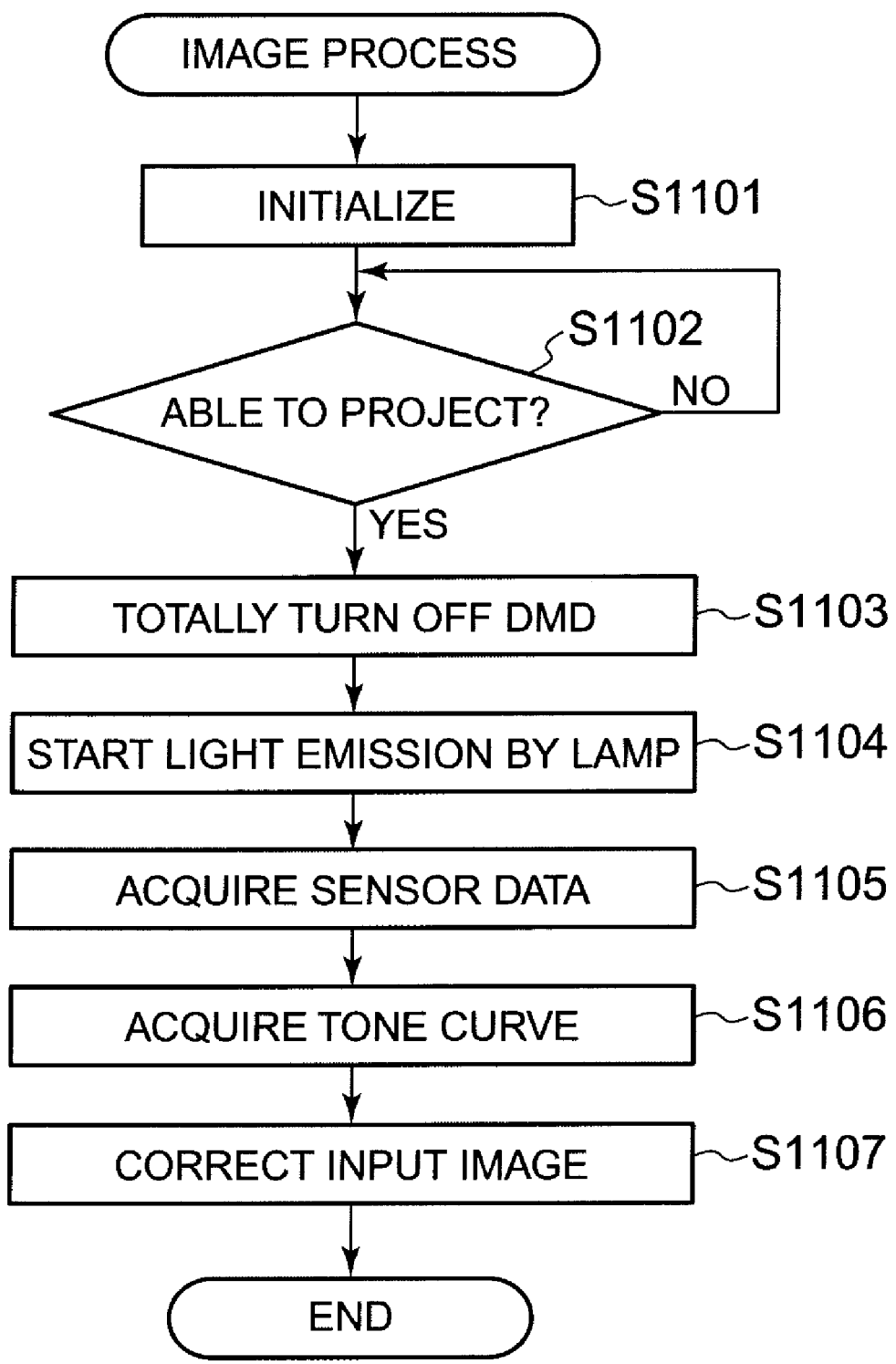
FIG. 11 is a flowchart for explaining the image process by the projection apparatus of the present invention according to the second embodiment.

Next, the image process performed by the image correction unit 905, etc. of the second embodiment will be explained with reference to the flowchart of FIG. 11. In the present embodiment, the image correction unit 905, etc. perform this image process immediately after the projection apparatus 1 is turned on. However, the timing to perform the image process is not limited to this.

First, the image correction unit 905 initializes the display unit 203, etc. (step S101). Specifically, the image correction unit 905 starts power supply to the lamp 301 of the display unit 203, and warms the lamp 301 to a temperature sufficient for projecting an image. Further, the image correction unit 905 controls the positions of the color wheel 302 and the micromirrors 501 of the DMD 305 to be the initial states.

Next, the image correction unit 905 determines whether or not the display unit 203 has become able to project an image (step S1102). Specifically, for example, the image correction unit 905 determines whether or not the temperature of the lamp 301 has reached a temperature sufficient for projecting an image.

In a case where the display unit 203 has not become able to project an image (step S1102; NO), the image correction unit 905 waits until the display unit 203 becomes able to project an image.

To the contrary, in a case where the display unit 203 as become able to project an image (step SI 102; YES), the image correction unit 905 controls the DMD 305 to be totally turned off (step S1103). That is, the image correction unit 905 controls the display unit 203 to orient all the micromirrors of 501 of the DMD 305 to the direction in which the color sensor 306 is positioned.

Next, the image correction unit 905 controls the lamp 301 to start light emission (step SI 104). Here, since the micromirrors 501 face not the first direction in which the projection lens 307 is positioned, but the second direction in which the color sensor 306 is positioned, the projection light enters the color sensor 306 but does not enter the projection lens 307.

The sensor unit 902 detects the projection light that enters the color sensor 306 and acquires sensor data, and inputs the sensor data to the selection unit 904. The selection unit 904 acquires this sensor data (step S1105). As described above, this sensor data is data which represents, for example, the visible light spectrums of the transmitting light dividedly as color signals of red, green, and blue (three primary colors), with the luminance (light intensity) of each color evaluated in 256 grades.

The selection unit 904 selects and acquires correction information from the storage unit 903 based on the sensor data detected by the color sensor 306, and inputs the acquired correction information to the image correction unit 905. The image correction unit 905 acquires, for example, a tone curve 1001 as the correction information (step SI 106).

The image correction unit 905 performs correction, such as gamma correction or the like on the input image, based on the correction information acquired, which is, for example, a tone curve 1001 (step S1107). The corrected image data is stored in the frame memory comprised in the image processing unit 202. The image data stored in the frame memory is converted into a video signal at a predetermined synchronization timing, output to the display unit 203, and as a result projected on the screen 6, and the user can view the projected image as corrected. The correction information such as the tone curve 1001 or the like used for image correction performed at this step is stored in the RAM 205 so that a similar correction may be performed at the predetermined synchronization timing.

It is possible to provide a notification unit which determines whether or not the luminance of the light detected by the color sensor 306 is equal to or smaller than a predetermined reference value, and gives a notification for urging replacement of the light source in a case where the luminance of the light detected by the color sensor 306 is equal to or smaller than the predetermined reference value. The control unit 201 may make the determination whether the luminance of the light detected by the color sensor 306 is equal to or smaller than the predetermined reference value. Then, in a case where it is determined that the luminance of the light detected by the color sensor 306 is equal to or smaller than the predetermined reference value, the control unit 201 controls the notification unit to give a notification for urging replacement of the light source. The reference value, which triggers a notification for urging replacement of the light source when the luminance of the light becomes equal to or smaller than which, may be arbitrarily set according to the type of the light source used for the projector. For example, if the projector is for a large-sized liquid crystal display, the reference value of the luminance of the light source to be used may be set high. An alarm mechanism for notifying replacement of the light source by alarm may be used as the notification unit. A light mechanism for notifying replacement of the light source by light may be used as another notification unit.

As described above, according to the second embodiment, the projection apparatus 1 can achieve, in addition to the effect of the foregoing embodiment, an effect that any variation in the output characteristics of the output image, due to the characteristic of the display unit 203, the attaching errors of the color wheel 302, the DMD 305, etc., changes by aging, difference in use environment, etc., can be automatically and easily corrected with no feeling of strangeness given to the user.

Further, even during image projection, a part of the light modulation device might be in an OFF state (i.e., face the direction of the sensor) to blacken a part of the projected image (particularly, the circumferential part of the light modulation device may always be set in the OFF state so that no image may be projected). Therefore, image correction may not be performed at a predetermined timing before an image is projected, but light modulated by the light modulation device may be detected by the sensor at a predetermined timing during image projection so that image correction may be performed at such a timing. With such configuration, more minute image correction is available.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-74750 filed on Mar. 17, 2006 and Japanese Patent Application No. 2006-74751 filed on Mar. 17, 2006 and including specification, claims, drawings and summary. The disclosures of the above Japanese Patent Applications are incorporated herein by reference in their entireties.

What is claimed is:

1. A projection apparatus, comprising:
a color wheel including a transmission region which allows a red ray of light emitted from a light source to pass therethrough, a transmission region which allows a blue ray of the light to pass therethrough, and a transmission region which allows a green ray of the light to pass therethrough;
a sensor which detects a ray of light that has passed through the color wheel and has been modulated by a light modulation device; and
a control unit which controls a ray of light that has passed through the color wheel to be directed in a first direction in which an image is projected, or, at a predetermined timing, to be directed in a second direction in which the sensor is disposed, obtains a time-division pattern of each color of the color wheel based on correspondence between rotation positions of the color wheel and colors of rays of light received by the sensor, to perform control of a proceeding direction of a ray of light modulated by the light modulation device, based on the obtained time-division pattern of each color, and synchronizes control of rotation of the color wheel and the control of the proceeding direction of the ray of light modulated by the light modulation device, based on the obtained time-division pattern of each color.

2. The projection apparatus according to claim 1, wherein the color wheel comprises a time-division pattern variable color wheel on which the transmission regions form a variable pattern such that the time-division pattern of each color is variable.

3. The projection apparatus according to claim 1, wherein the control unit controls a ray of light that has passed through the color wheel to enter the second direction, at a timing at which a light path passes any two of the transmission regions of the color wheel including the transmission region for allowing a red ray of light to pass, the transmission region for allowing a blue ray of light to pass, and the transmission region for allowing a green ray of light to pass.

4. The projection apparatus according to claim 1, wherein the sensor comprises a color sensor which detects a wavelength of a ray of light, within a range of visible light spectrums.

5. The projection apparatus according to claim 1, further comprising a time counting unit which counts a period of time that passes after the projection apparatus is turned on, wherein when the time counting unit counts a predetermined period of time, the control unit senses a current timing as the predetermined timing.

6. The projection apparatus according to claim 1, further comprising a temperature measuring unit which measures a temperature rise of the projection apparatus after the projection apparatus is turned on, wherein when the temperature measuring unit measures a temperature rise amounting to a predetermined degree, the control unit senses a current timing as the predetermined timing.

7. A projection method for a projection apparatus that comprises (i) a color wheel, which includes a transmission region for allowing a red ray of light emitted from a light source to pass therethrough, a transmission region for allowing a blue ray of the light to pass therethrough, and a transmission region for allowing a green ray of the light to pass therethrough, wherein a ray of light that has passed through the color wheel is modulated by a light modulation device, and (ii) a sensor for detecting a ray of light that has passed through the color wheel and has been modulated by the light modulation device, the method comprising:
controlling a ray of light that has passed through the color wheel to be directed in a first direction in which an image is projected, or, at a predetermined timing, to be directed in a second direction in which the sensor is disposed; and
obtaining a time-division pattern of each color of the color wheel based on correspondence between rotation positions of the color wheel and colors of rays of light received by the sensor, to perform control of a proceeding direction of a ray of light modulated by the light modulation device, based on the obtained time-division pattern of each color, and synchronizing control of rotation of the color wheel and the control of the proceeding direction of the ray of light modulated by the light modulation device, based on the obtained time-division pattern of each color.

8. A non-transitory computer-readable recording medium having stored thereon a program that is executable by a computer of a projection apparatus which comprises (i) a color wheel including a transmission region for allowing a red ray of light emitted from a light source to pass therethrough, a transmission region for allowing a blue ray of the light to pass therethrough, and a transmission region for allowing a green ray of the light to pass therethrough, and (ii) a sensor for detecting a ray of light that has passed through the color wheel and has been modulated by a light modulation device, wherein the program is executable by the computer to control the projection apparatus to perform functions comprising:

controlling a ray of light that has passed through the color wheel to be directed in a first direction in which an image is projected, or, at a predetermined timing, to be directed in a second direction in which the sensor is disposed; and obtaining a time-division pattern of each color of the color wheel based on correspondence between rotation positions of the color wheel and colors of rays of light received by the sensor, to perform control of a proceeding direction of a ray of light modulated by the light modulation device, based on the obtained time-division pattern of each color, and performing control to synchronize control of rotation of the color wheel and the control of the proceeding direction of the ray of light modulated by the light modulation device, based on the obtained time-division pattern of each color.

9. The projection apparatus according to claim 1, further comprising:

an image acquiring unit which acquires an image to be projected;

a storage unit which stores predetermined correction information for correcting the image acquired by the image acquiring unit;

a selection unit which selects the correction information based on a luminance of a ray of light detected by the sensor, and acquires the selected correction information from the storage unit; and an image correction unit which corrects the image acquired by the image acquiring unit based on the correction information acquired by the selection unit, and outputs the corrected image.

10. The projection apparatus according to claim 9, wherein a timing at which the sensor senses a ray of light is a timing at which a predetermined period of time passes after the projection apparatus is turned on.

11. The projection apparatus according to claim 9, wherein the selection unit receives an input of data which designates a grade of brightness, and a grade of contrast, of the image acquired by the image acquiring unit, and acquires the correction information based on at least one of the grade of the brightness and the grade of the contrast.

12. The projection apparatus according to claim 9, further comprising a notification unit which determines whether or not a luminance of a ray of light detected by the sensor is equal to or smaller than a predetermined reference value, and gives a notification for urging replacement of the light source in a case where the luminance of the ray of light detected by the sensor is equal to or smaller than the predetermined reference value.

13. The projection apparatus according to claim 11, wherein the control unit performs control of the luminance, the brightness, or the contrast for each of red, green, and blue components of light.

14. The projection apparatus according to claim 9, wherein a timing at which the image correction unit corrects an image and outputs it is an arbitrary timing during image projection.

* * * * *